(12) United States Patent
So et al.

(10) Patent No.: US 9,778,709 B2
(45) Date of Patent: Oct. 3, 2017

(54) EVAPORATOR, COOLING DEVICE, AND ELECTRONIC APPARATUS

(71) Applicant: FUJITSU LIMITED, Kawasaki-shi, Kanagawa (JP)

(72) Inventors: Tsuyoshi So, Kawasaki (JP); Hideo Kubo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 14/922,235

(22) Filed: Oct. 26, 2015

(65) Prior Publication Data

US 2016/0124474 A1    May 5, 2016

(30) Foreign Application Priority Data

Nov. 4, 2014   (JP) .................................. 2014-224174

(51) Int. Cl.
*G06F 1/20*   (2006.01)
*F28D 15/02*   (2006.01)

(52) U.S. Cl.
CPC ............... *G06F 1/20* (2013.01); *F28D 15/02* (2013.01)

(58) Field of Classification Search
CPC ............... G06F 1/20; F28D 2021/0064; F28D 15/0266; H01L 23/4336
USPC .................................... 361/679.52, 700, 701
See application file for complete search history.

(56) References Cited

U.S. PATENT DOCUMENTS

| 4,258,383 | A | * | 3/1981 | Kessler, Jr. | ............... | F28F 3/12 |
| | | | | | | 165/104.31 |
| 5,384,687 | A | * | 1/1995 | Sano | ................... | H01L 23/4336 |
| | | | | | | 165/185 |
| 2002/0075652 | A1 | | 6/2002 | Berchowitz | | |
| 2004/0112585 | A1 | * | 6/2004 | Goodson | ............... | F04B 19/006 |
| | | | | | | 165/299 |
| 2006/0096743 | A1 | * | 5/2006 | Lee | ...................... | F28D 15/0266 |
| | | | | | | 165/104.33 |
| 2008/0216991 | A1 | | 9/2008 | Oikawa | | |
| 2013/0063896 | A1 | * | 3/2013 | Satou | .................. | F28D 15/0266 |
| | | | | | | 361/700 |

FOREIGN PATENT DOCUMENTS

| JP | 06-005754 | 1/1994 |
| JP | 2002-168547 | 6/2002 |
| JP | 2008-218589 | 9/2008 |
| JP | 2013-219165 | 10/2013 |
| JP | 2013-243277 | 12/2013 |

* cited by examiner

*Primary Examiner* — Tuan T Dinh
*Assistant Examiner* — Mukund G Patel
(74) *Attorney, Agent, or Firm* — Fujitsu Patent Center

(57) ABSTRACT

There is provided an evaporator including: a container including a top plate, and a bottom plate configured to be heated by an electronic component; a reinforcing member having a tubular shape extending from the bottom plate to the top plate, and configured such that a coolant is introduced inside the reinforcing member; a side opening formed in a side portion of the reinforcing member, and configured to allow the coolant to flow out to the bottom plate; and a discharge port provided in the top plate outside the reinforcing member, and configured to discharge vapor from the container, the vapor being generated by the coolant contacting the bottom plate.

13 Claims, 15 Drawing Sheets

EVAPORATOR, COOLING DEVICE, AND ELECTRONIC APPARATUS

CROSS-REFERENCE TO RELATED APPLICATION

This application is based upon and claims the benefit of priority of the prior Japanese Patent Application No. 2014-224174, filed on Nov. 4, 2014, the entire contents of which are incorporated herein by reference.

FIELD

The embodiments discussed herein are related to an evaporator, a cooling device, and an electronic apparatus.

BACKGROUND

An electronic apparatus such as a server or a personal computer is mounted with an electronic component such as a CPU (Central Processing Unit). When the electronic component generates heat exceeding its permissible temperature, the operation of the electronic component is no longer guaranteed, resulting in a failure in the electronic apparatus. In order to prevent such an occurrence, the server or the like is provided with a cooling device for cooling the electronic component.

The cooling devices are broadly categorized into an air-cooling type and a liquid-cooling type. Of these, the liquid-cooling type is advantageous over the air-cooling type in that the liquid-cooling type may efficiently cool the electronic component by quickly removing heat of the electronic component utilizing heat of vaporization of a coolant such as water.

The cooling device of the liquid-cooling type is provided with an evaporator for vaporizing the coolant by the heat of the electronic component.

The evaporator is provided with a bottom plate, and the electronic component comes in thermal contact with the bottom plate and thereby the electronic component is cooled by the heat of vaporization of the coolant in the evaporator. Then, it is desirable that the bottom plate be made as thin as possible to reduce thermal resistance of the bottom plate, in order to efficiently transfer the heat of the electronic component through the bottom plate to the coolant in the evaporator.

Further, to efficiently cool the electronic component, it is desirable that the coolant introduced into the evaporator be vaporized by the heat of the electronic component.

However, when the bottom plate of the evaporator is made thin as mentioned above, the bottom plate may decrease in strength and hence become deformed. Thus, the bottom plate is separated from the electronic component, so that the heat of the electronic component is no longer efficiently transferred to the evaporator.

Also, a condenser for condensing vapor of the coolant is connected to the evaporator; however, part of the coolant in the evaporator does not vaporize but returns to the condenser with its state remaining in liquid phase. Because of contributing little to the cooling of the electronic component, such a coolant becomes one of factors which decrease cooling efficiency of the evaporator.

Note that technologies related to the present application are disclosed in Japanese Laid-open Patent Publication Nos. 06-5754, 2008-218589, 2013-219165, 2002-168547, and 2013-243277.

SUMMARY

According to one aspect of the disclosure given below, there is provided an evaporator including a container including a top plate, and a bottom plate configured to be heated by an electronic component, a reinforcing member having a tubular shape extending from the bottom plate to the top plate, and configured such that a coolant is introduced inside the reinforcing member, a side opening formed in a side portion of the reinforcing member, and configured to allow the coolant to flow out to the bottom plate, and a discharge port provided in the top plate outside the reinforcing member, and configured to discharge vapor from the container, the vapor being generated by the coolant contacting the bottom plate.

Also, according to another aspect of the disclosure, there is provided a cooling device including an evaporator configured to evaporate a coolant, a condenser configured to condense vapor of the coolant, a liquid pipe configured to connect the evaporator and the condenser so as to supply the coolant in liquid phase from the condenser to the evaporator, and a vapor pipe configured to connect the evaporator and the condenser so as to supply the vapor from the evaporator to the condenser, wherein the evaporator includes a container including a top plate, and a bottom plate configured to be heated by an electronic component, a reinforcing member having a tubular shape extending from the bottom plate to the top plate, and configured such that a coolant supplied through the liquid pipe is introduced inside the reinforcing member, a side opening formed in a side portion of the reinforcing member, and configured to allow the coolant to flow out to the bottom plate, and a discharge port provided in the top plate outside the reinforcing member, and configured to discharge the vapor to the vapor pipe, the vapor being generated by the coolant contacting the bottom plate.

Further, according to still another aspect of the disclosure, there is provided an electronic apparatus including an electronic component, an evaporator configured to evaporate a coolant by heat of the electronic component, a condenser configured to condense vapor of the coolant, a liquid pipe configured to connect the evaporator and the condenser so as to supply the coolant in liquid phase from the condenser to the evaporator, and a vapor pipe configured to connect the evaporator and the condenser so as to supply the vapor from the evaporator to the condenser, wherein the evaporator includes a container including a top plate, and a bottom plate configured to be heated by the electronic component, a reinforcing member having a tubular shape extending from the bottom plate to the top plate, and configured such that a coolant supplied through the liquid pipe is introduced inside the reinforcing member, a side opening formed in a side portion of the reinforcing member, and configured to allow the coolant to flow out to the bottom plate, and a discharge port provided in the top plate outside the reinforcing member, and configured to discharge the vapor to the vapor pipe, the vapor being generated by the coolant contacting the bottom plate.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Prior to description of embodiments, description will be given to matters studied by the inventor.

Figure 1:
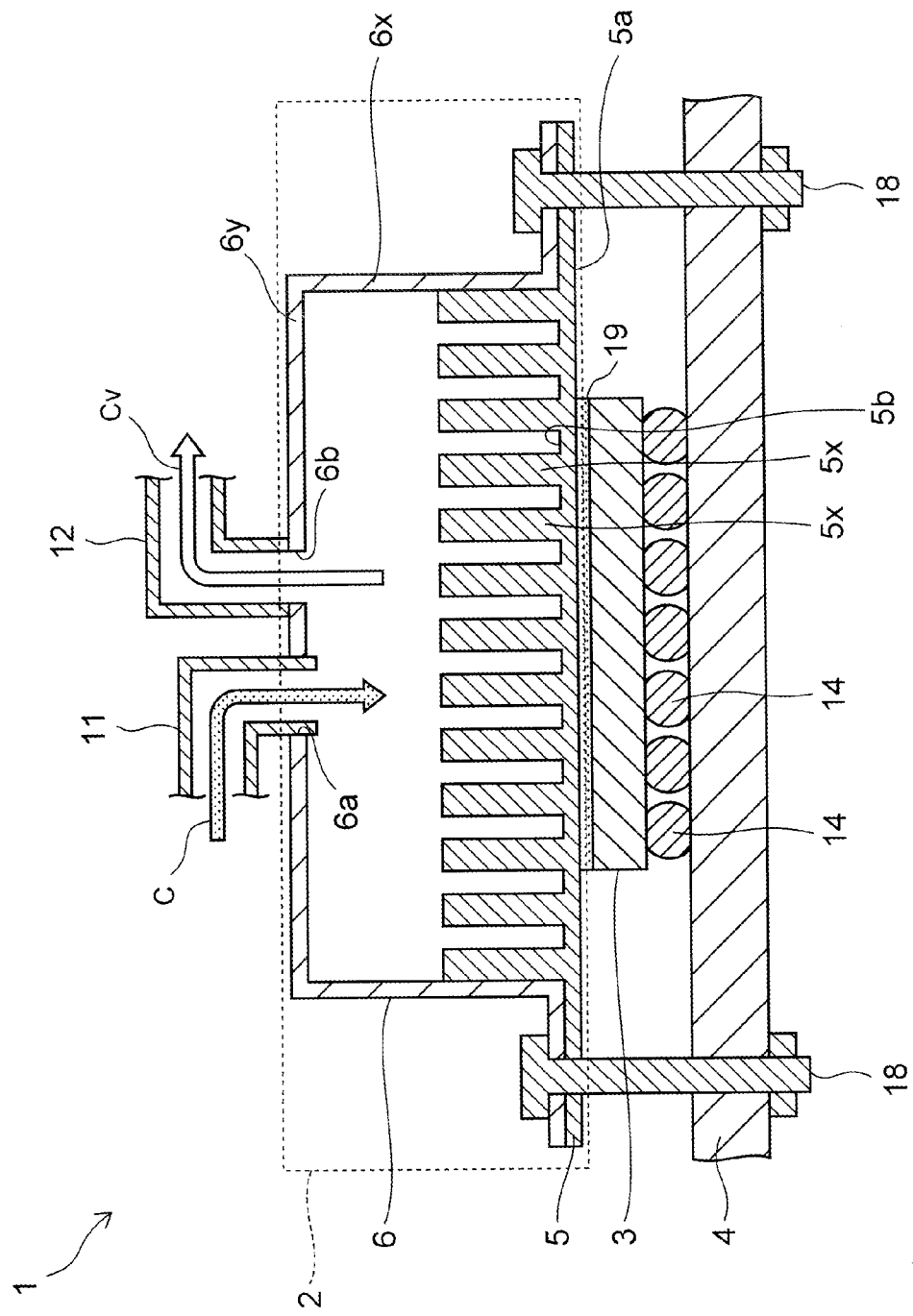
FIG. 1 is an enlarged sectional view of an electronic apparatus used for study.

FIG. 1 is an enlarged sectional view of an electronic apparatus used for the study.

An electronic apparatus 1, which is a server for example, includes an evaporator 2 and an electronic component 3.

The electronic component 3 is a component, such as a CPU, which generates heat during operation, and the electronic component 3 is connected via solder bumps 14 to a circuit board 4.

Meanwhile, the evaporator 2 is used to cool the electronic component 3 by heat of vaporization of a coolant C, and includes a bottom plate 5 and a cover 6.

An outside bottom surface 5a of the bottom plate 5 is thermally connected with the electronic component 3 mentioned above. Also, a thermally coupling material 19 such as a TIM (Thermal Interface Material) is disposed between the electronic component 3 and the outside bottom surface 5a in order to reduce thermal resistance thereacross insofar as possible.

Meanwhile, an inside bottom surface 5b of the bottom plate 5 is provided with a plurality of protrusions 5x. Spaces between the protrusions 5x serve as micro-channels for the coolant C to flow therethrough. This enables increasing an area of contact between the coolant C and the inside bottom surface 5b and thus efficiently cooling the electronic component 3 by the heat of vaporization of the coolant C, as compared to a case where the inside bottom surface 5b is in the form of a flat surface.

Also, the cover 6, which is made of a metallic material such as copper or stainless steel, includes a sidewall 6x and a top plate 6y. The top plate 6y is arranged facing the bottom plate 5, and includes a supply port 6a and a discharge port 6b.

A liquid pipe 11 is connected to the supply port 6a, and the coolant C in liquid phase flowing through the liquid pipe 11 is supplied via the supply port 6a to the evaporator 2. Also, a vapor pipe 12 is connected to the discharge port 6b, and vapor Cv of the coolant C generated by the evaporator 2 is discharged via the discharge port 6b to the vapor pipe 12.

Metal which is good in thermal conductivity, such as copper or stainless steel, is often adopted as a material for the bottom plate 5 of the evaporator 2 in order to quickly cool the electronic component 3 by the heat of vaporization of the coolant C, and thus, the evaporator 2 increases in weight.

Consequently, when the thermally coupling material 19 alone is used to adhesively bond the evaporator 2 and the electronic component 3 together, the attitude of the evaporator 2 of heavy weight becomes unstable on top of the electronic component 3, and thus the evaporator 2 may peel off from the electronic component 3. The attitude of the evaporator 2 is prone to become unstable due to vibrations during transport, in particular when the electronic apparatus 1 is transported.

In this example, therefore, screws 18 are used to mechanically fix the evaporator 2 to the circuit board 4, thereby stabilizing the attitude of the evaporator 2.

According to this structure, moreover, the electronic component 3 is sandwiched between the evaporator 2 and the circuit board 4, and thus, it is conceivable that the electronic component 3 keeps close contact with the evaporator 2 with the thermally coupling material 19 interposed in between.

Next, description will be given with regard to operation of the evaporator 2.

The bottom plate 5 of the evaporator 2 is heated by heat generated by the electronic component 3, and under such a condition, the coolant C in the liquid phase is supplied through the supply port 6a to the evaporator 2, and thereby, the coolant C is vaporized by heat of the bottom plate 5.

Here, the electronic component 3 is cooled by heat of vaporization, and also, the vapor Cv of the coolant C generated by the vaporization escapes through the discharge port 6b. The vapor Cv is liquefied by a condenser (not illustrated), and thereafter, the vapor Cv is supplied again through the supply port 6a to the evaporator 2 and is used to cool the electronic component 3.

According to the evaporator 2 as described above, the electronic component 3 may be always cooled by the heat of vaporization of the coolant C, and hence it is conceivable that cooling efficiency for the electronic component 3 is high.

However, it is apparent that the evaporator 2 has need for improvement as given below.

Figure 2:
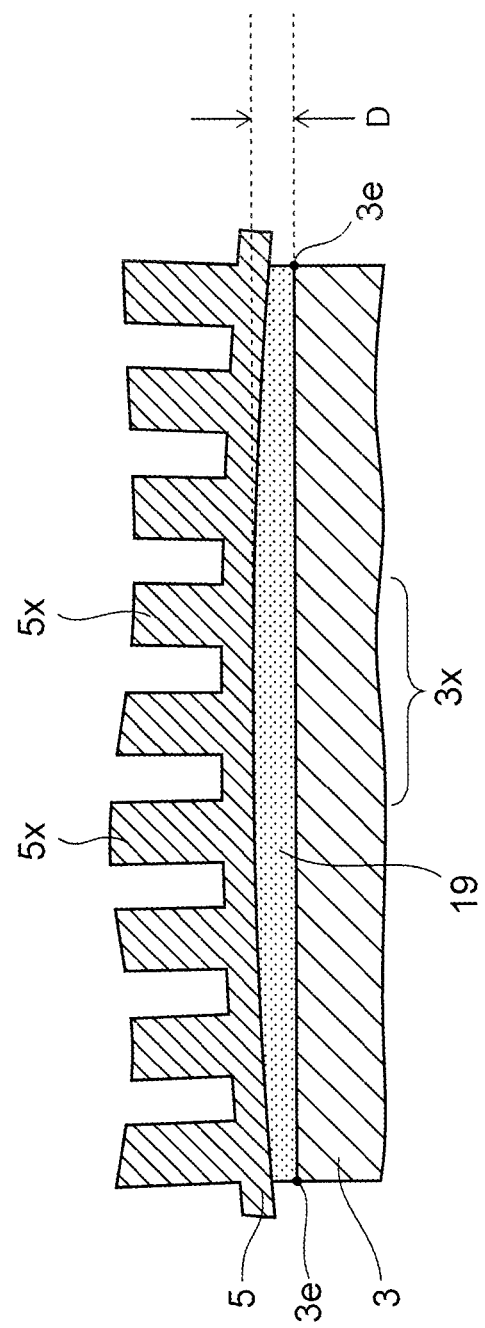
FIG. 2 is an enlarged sectional view of a bottom plate of an evaporator and its vicinity.

FIG. 2 is an enlarged sectional view of the bottom plate 5 of the evaporator 2 and its vicinity.

When the evaporator 2 is mechanically fixed to the circuit board 4 as mentioned above, corner portions 3e of the electronic component 3 act as fulcrums to curve the bottom plate 5 and thus increase a distance D between a central portion 3x of the electronic component 3 and the bottom plate 5. This increases thermal resistance across the bottom plate 5 and the electronic component 3, thus making it difficult for the evaporator 2 to cool the electronic component 3.

The central portion 3x of the electronic component 3, in particular, needs to receive priority for cooling because of tending to rise high in temperature; nevertheless, when the bottom plate 5 is separated upward from the central portion 3x as mentioned above, the temperature of the electronic component 3 exceeds a permissible temperature, and operation of the electronic component 3 is not guaranteed.

Figure 3:
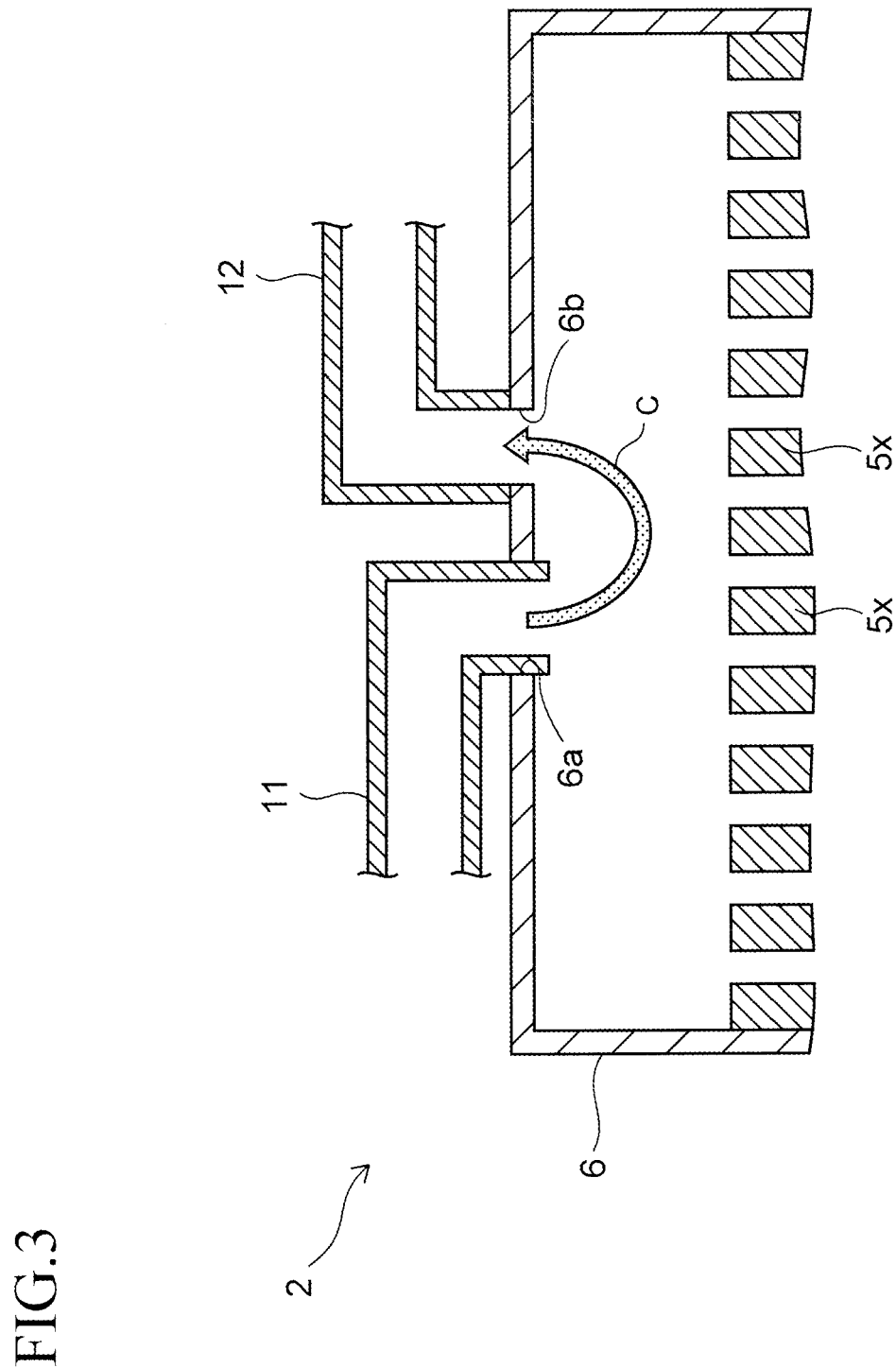
FIG. 3 is an enlarged sectional view of the evaporator in the vicinity of a supply port and a discharge port.

Meanwhile, FIG. 3 is an enlarged sectional view of the evaporator 2 in the vicinity of the supply port 6a and the discharge port 6b.

As mentioned above, most of the coolant C in the liquid phase supplied through the supply port 6a is vaporized by heat of the electronic component 3 (see FIG. 1); however, part of the coolant C, under an inertial force when supplied, may escape through the discharge port 6b adjacent to the supply port 6a with its state remaining in liquid phase. The coolant C in the liquid phase escaping through the discharge port 6b in this manner does not contribute to cooling of the electronic component 3, which in turn decreases the cooling efficiency for the electronic component 3.

Description will be given below with regard to the embodiment capable of reducing the likelihood of the coolant C in the liquid phase escaping from the supply port 6a to the discharge port 6b, while suppressing deformation in the bottom plate 5 as illustrated in FIG. 2.

Embodiment

Figure 4:
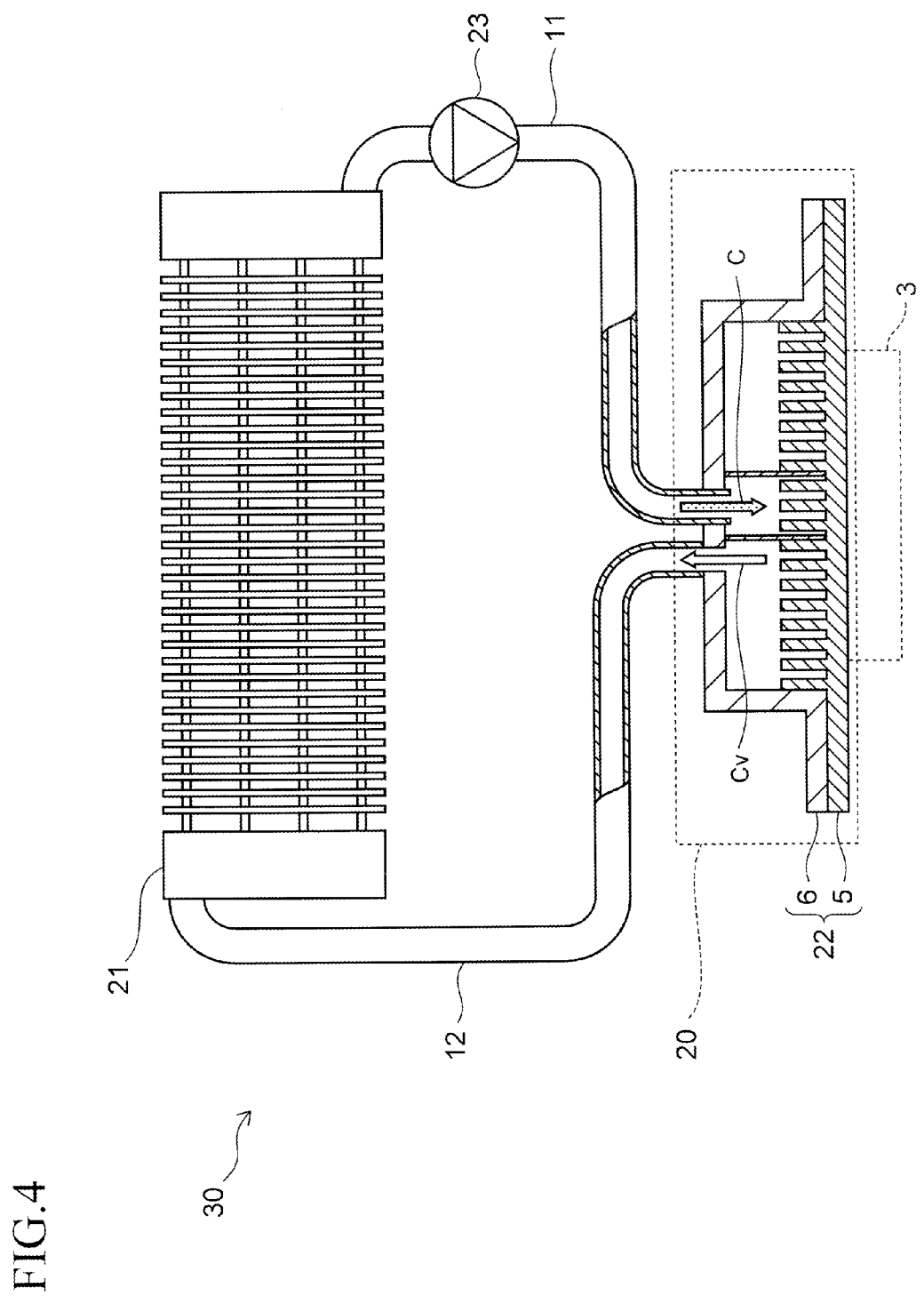
FIG. 4 is a view of a configuration of a cooling device according to an embodiment.

FIG. 4 is a view of a configuration of a cooling device according to the embodiment.

In FIG. 4, the same elements as those described with reference to FIGS. 1 to 3 are indicated by the same reference numerals as those used in these drawings, and description of the same elements will hereinafter be omitted.

A cooling device 30, which is used in an electronic apparatus such as a server, includes an evaporator 20 and a condenser 21.

The evaporator 20 includes a container 22 defined by the bottom plate 5 and the cover 6, and the electronic component 3 is cooled by heat of vaporization of the coolant C supplied to the container 22. The coolant C is water, for example. Also, the container 22 may be depressurized in order to promote the vaporization of the coolant C.

Then, the vapor Cv of the coolant C generated by the evaporator 20 is cooled by the condenser 21 of an air-cooling type thereby to change again into liquid phase.

The evaporator 20 and the condenser 21 are connected together by the liquid pipe 11 and the vapor pipe 12 thereby to form a flow path in a loop for the coolant C to circulate therethrough. Also, the liquid pipe 11 is provided with a pump 23 for circulating the coolant C through the flow path.

Note that the pump 23 may be omitted when the coolant C autonomously circulates even without the pump 23.

Figure 5:
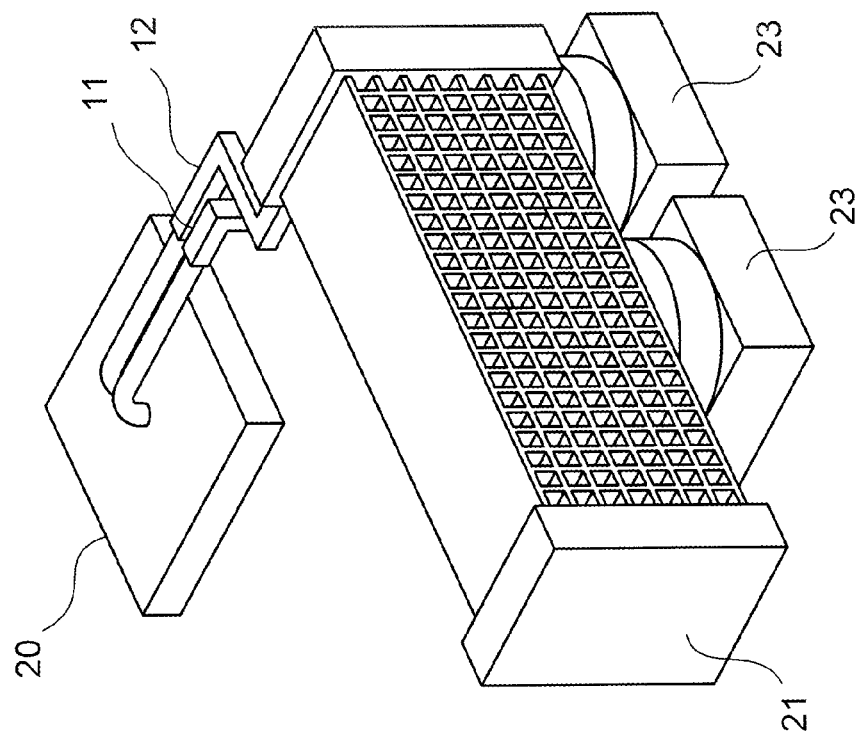
FIG. 5 is a perspective view illustrating one example of a way of arranging an evaporator and a condenser in the embodiment.

FIG. 5 is a perspective view illustrating one example of a way of arranging the evaporator 20 and the condenser 21.

In this example, the evaporator 20 is disposed side by side with the condenser 21, and the evaporator and the condenser 21 are connected together by the liquid pipe 11 and the vapor pipe 12 extending horizontally. Then, the liquid pipe 11 hidden under the condenser 21 is provided with the two pumps 23.

Figure 6:
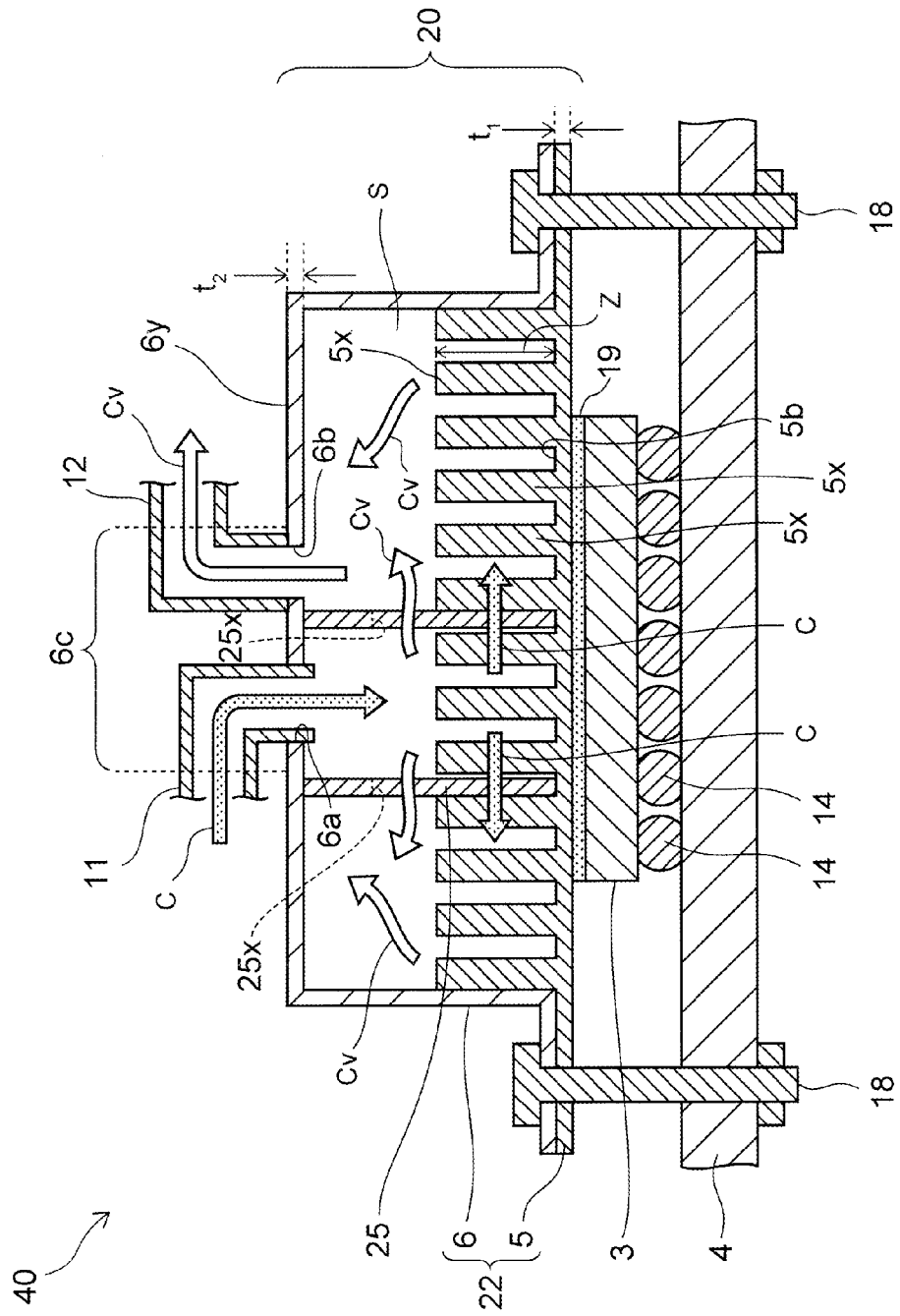
FIG. 6 is an enlarged sectional view of an electronic apparatus according to the embodiment.

FIG. 6 is an enlarged sectional view of an electronic apparatus 40 according to the embodiment including the cooling device 30. In FIG. 6, the same elements as those described with reference to FIGS. 1 to 3 are indicated by the same reference numerals as those used in these drawings, and description of the same elements will hereinafter be omitted.

The electronic apparatus 40, which is a server for example, includes the circuit board 4, and the electronic component 3, such as a CPU, fixed on the circuit board 4.

The electronic component 3 is in thermal contact with the evaporator 20, and is cooled by the heat of vaporization of the coolant C as mentioned above.

Also, the evaporator 20 is mechanically fixed to the circuit board 4 by the screws 18, as is the case with the example of FIG. 1, in order to stabilize the attitude of the evaporator 20 on the electronic component 3.

The thermally coupling material 19 is disposed between the electronic component 3 and the evaporator 20 in order to provide good heat conductivity therebetween. A material for the thermally coupling material 19 is not particularly limited. For example, a TIM in the form of grease, having no adhesion, may be used for the thermally coupling material 19, or a TIM having adhesion may be used for the thermally coupling material 19.

Regardless of whether or not the thermally coupling material 19 has adhesion, the evaporator 20 is mechanically fixed to the circuit board 4 by the screws 18 as mentioned above, and thus, the evaporator 20 and the electronic component 3 keeps close contact with each other with the thermally coupling material 19 interposed in between.

Although a material for the bottom plate 5 of the evaporator 20 is also not particularly limited, it is preferable that the bottom plate 5 be made of copper or stainless steel excellent in thermal conductivity, in order to quickly transfer heat of the electronic component 3 to the inside bottom surface 5b of the bottom plate 5.

Also, as is the case with the example of FIG. 1, the inside bottom surface 5b of the bottom plate 5 is provided with the plurality of protrusions 5x for defining the micro-channels, thus increasing the area of contact between the coolant C and the inside bottom surface 5b. A height Z of the protrusion 5x is of the order of 10 mm, for example.

The vapor Cv generated by the coolant C contacting the inside bottom surface 5b and the protrusions 5x is collected in space S between the protrusions 5x and the top plate 6y and is then discharged through the discharge port 6b.

If the vapor Cv stays in the space S, the bottom plate 5 is heated by the vapor Cv. In order to prevent such an occurrence, it is preferable that a height of the container 22 be set about two times the height Z of the protrusion 5x thereby to ensure the large space S and thus quickly discharge the vapor Cv from the space S to the discharge port 6b.

Here, in order to quickly transfer the heat of the electronic component 3 to the inside bottom surface 5b, it is advantageous that the bottom plate 5 is made as thin as possible to reduce thermal resistance of the bottom plate 5. In the embodiment, a thickness $t_1$ of the bottom plate 5 is set less than a thickness $t_2$ of the top plate 6y thereby to reduce the thermal resistance of the bottom plate 5. For example, when the thickness $t_2$ of the top plate 6y is of the order of 5 mm, the thickness $t_1$ of the bottom plate 5 may be set as small as the order of 1.5 to 2 mm.

However, when the bottom plate 5 is made thin in this manner, the bottom plate 5 may become deformed as illustrated in FIG. 2 by the action of forces exerted by the screws 18.

In the embodiment, therefore, a reinforcing member 25 extending from the bottom plate 5 to the top plate 6y is provided in the container 22 so that the reinforcing member 25 reinforces the bottom plate 5.

This suppresses the deformation in the bottom plate 5, thus enables preventing an increase in the distance D between the electronic component 3 and the bottom plate 5 as illustrated in FIG. 2, thus maintains the electronic component 3 adhering closely to the bottom plate 5 with the thermally coupling material 19 interposed in between, and hence enables improving the cooling efficiency for the electronic component 3.

Figure 7:
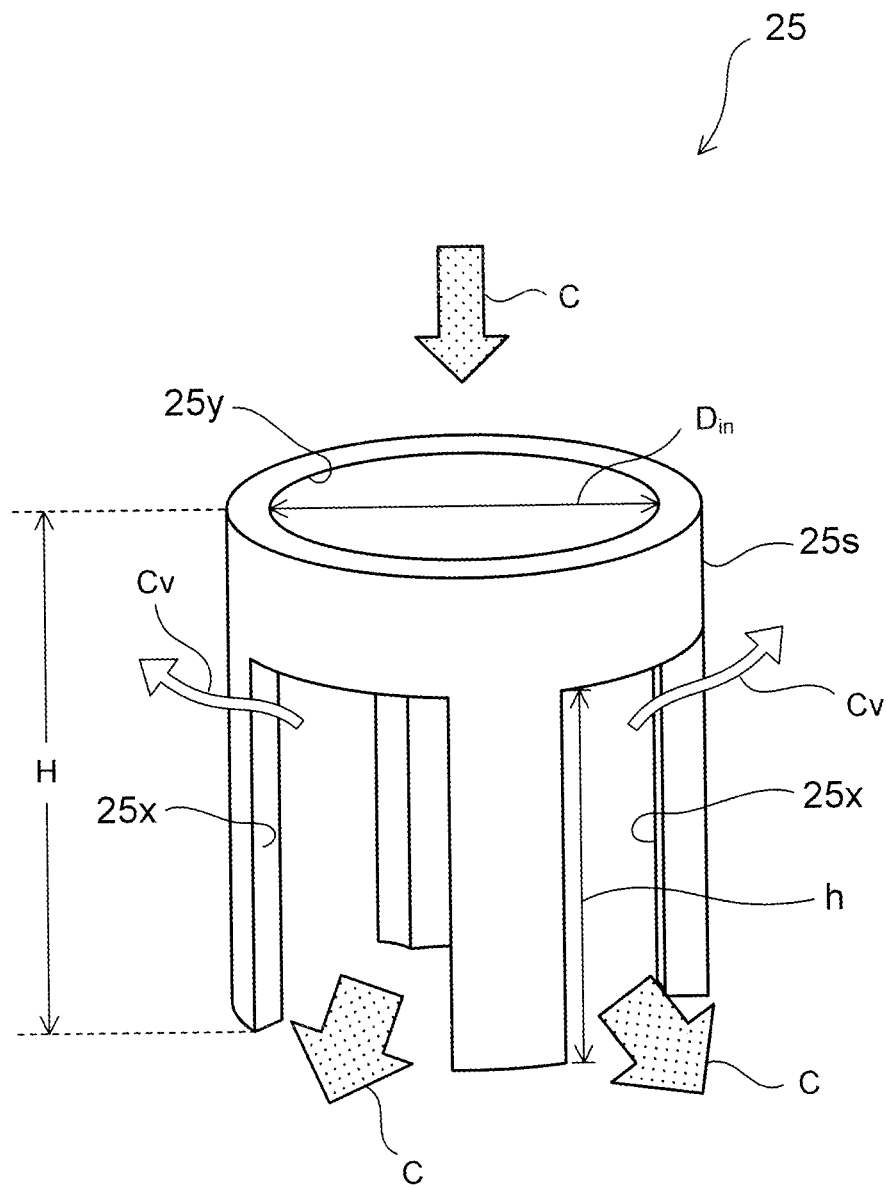
FIG. 7 is a perspective view of a reinforcing member according to the embodiment.

FIG. 7 is a perspective view of the reinforcing member 25.

As illustrated in FIG. 7, the reinforcing member 25 has a cylindrical shape, and its side portion 25s is provided with side openings 25x.

An upper opening end 25y of the reinforcing member 25 is linked to the supply port 6a (see FIG. 6), and the coolant C in the liquid phase supplied through the supply port 6a flows out through the side openings 25x to the bottom plate 5 (see FIG. 6).

Note that, before reaching the bottom plate 5, part of the coolant C supplied into the reinforcing member 25 vaporizes and changes into the vapor Cv and then escapes through the side openings 25x.

The number of the side openings 25x is not particularly limited, provided that a sufficient amount of the coolant C flows out to the bottom plate 5. For example, a single side opening 25x alone may be provided although the number of the side openings 25x is four in FIG. 7.

Dimensions of portions of the reinforcing member 25 are not particularly limited. For example, a height H of the reinforcing member 25 may be set to the order of about 20 mm, and an inside diameter $D_{in}$ thereof may be set to the order of 5 to 20 mm.

Further, a shape of the side opening 25x is formed substantially in a rectangular shape, and a height h thereof is set to the order of 10 to 15 mm.

A size of the side opening 25x may be appropriately set taking into account resistance which the coolant C undergoes from the side opening 25x, and strength of the reinforcing member 25.

For example, it is preferable that the side opening 25x be formed as large as possible, in order to reduce the resistance which the coolant C undergoes. When an opening area of the side openings 25x is set equal to or larger than a surface area of the side portion 25s therearound as illustrated in an example of FIG. 7, the resistance which the coolant C undergoes may be effectively reduced.

Meanwhile, when it is desired to increase the strength of the reinforcing member 25, the side opening 25x may be formed as small as possible.

A material for the reinforcing member 25 is not particularly limited, provided that the material has high rigidity such that it may reinforce the bottom plate 5. Besides metal such as copper or stainless steel, resin may be used to form the reinforcing member 25.

Figure 8:
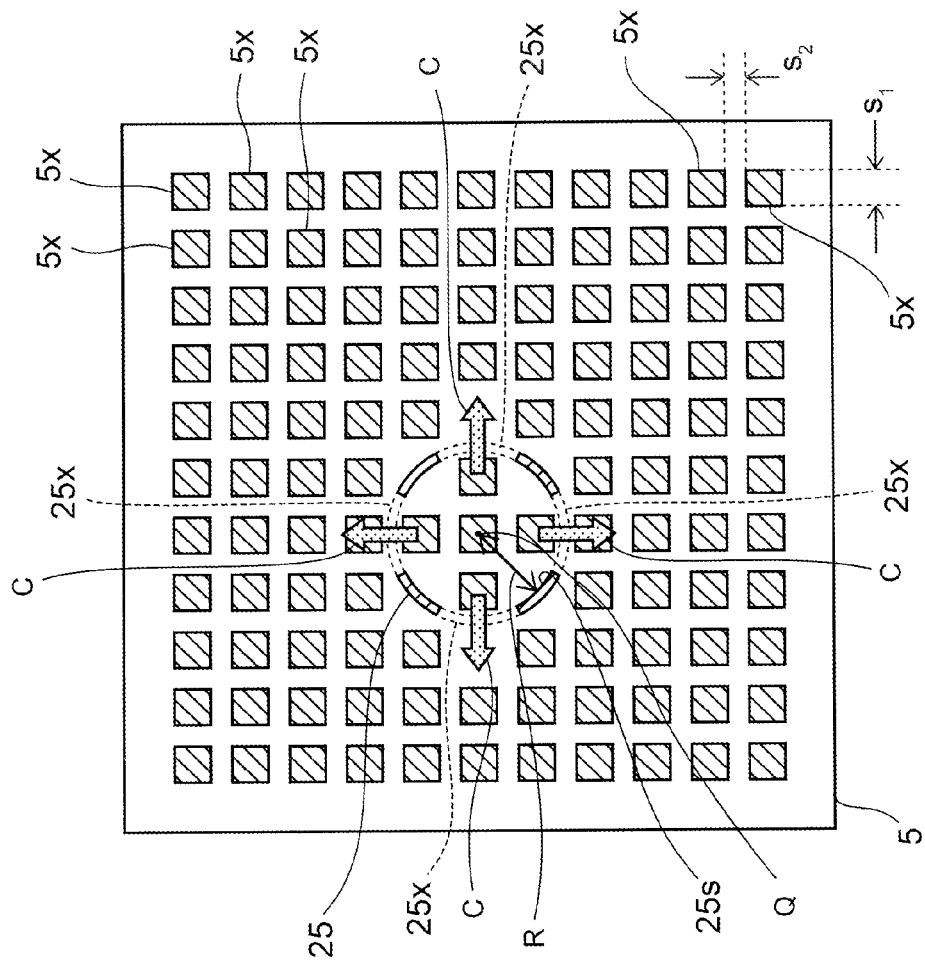
FIG. 8 is a top view of the reinforcing member and the bottom plate according to the embodiment.

FIG. 8 is a top view of the bottom plate 5 and the reinforcing member 25.

As illustrated in FIG. 8, each of the protrusions 5x has a square shape whose side length $S_1$ is of the order of 1.2 to 1.3 mm, as seen in a top view. Also, a distance $S_2$ between the two adjacent protrusions 5x is of the order of 0.7 to 0.8 mm.

In this example, the plurality of protrusions 5x are arranged in a grid pattern on the bottom plate 5, and the reinforcing member 25 is disposed in a standing position in a gap between the protrusions 5x.

The protrusions 5x are arranged in the grid pattern in this manner, and thereby, the coolant C flowing out through the side openings 25x spreads on the bottom plate 5 in all directions to thus enable suppressing variation of the amount of the coolant C from one place to another on the bottom plate 5.

Further, the cylindrical-shaped reinforcing member 25 has the same distance R between its center Q and the side portion 25s in all directions, and thus, resistance which the coolant C spreading wetly from the center Q undergoes from the reinforcing member 25 may become substantially the same in all directions, which in turn enables suppressing an increase in the resistance which the coolant C undergoes in a specific portion of the reinforcing member 25.

Also, when the plurality of side openings 25x are provided as is the case with the embodiment, it is preferable that the side openings 25x be disposed at equal intervals around the center Q. Thus, the coolant C flowing out through the side openings 25x uniformly spreads on the bottom plate 5, which in turn enables suppressing the occurrence of an insufficiently cooled portion on the bottom plate 5.

Reference will be made again to FIG. 6.

As illustrated in FIG. 6, the supply port 6a is disposed in a central portion 6c of the top plate 6y, and thus, the coolant C may be uniformly dispersed through the supply port 6a into the evaporator 20.

The discharge port 6b is also disposed in the central portion 6c, and the supply port 6a and the discharge port 6b are in close proximity to each other in the central portion 6c.

If a path through which the vapor Cv generated by heating by the bottom plate 5 reaches the discharge port 6b is long, the bottom plate 5 is heated by the vapor Cv; however, the disposition of the discharge port 6b in the central portion 6c as mentioned above enables preventing an increase in a length of a path through which the vapor Cv is discharged, and thus enables suppressing an increase in temperature of the bottom plate 5.

Then, the supply port 6a is located inside the reinforcing member 25, whereas the discharge port 6b is located outside the reinforcing member 25.

Thus, a structure is such that the supply port 6a and the discharge port 6b are separated from each other by the reinforcing member 25, and thus, the coolant C supplied through the supply port 6a is restrained from escaping directly through the discharge port 6b with its sate remaining in liquid phase. Consequently, the coolant C may be vaporized by the heat of the bottom plate 5, thus enabling an increase in the efficiency of cooling the electronic component 3 by the heat of vaporization of the coolant C.

In particular, when the supply port 6a and the discharge port 6b are in close proximity to each other as is the case with this example, the coolant C in the liquid phase is prone to escape from the supply port 6a directly to the discharge port 6b, and therefore, it is particularly highly advantageous that the supply port 6a and the discharge port 6b are separated from each other by the reinforcing member 25.

Next, description will be given with regard to a method of manufacturing the evaporator 20 according to the embodiment.

Figure 9A:
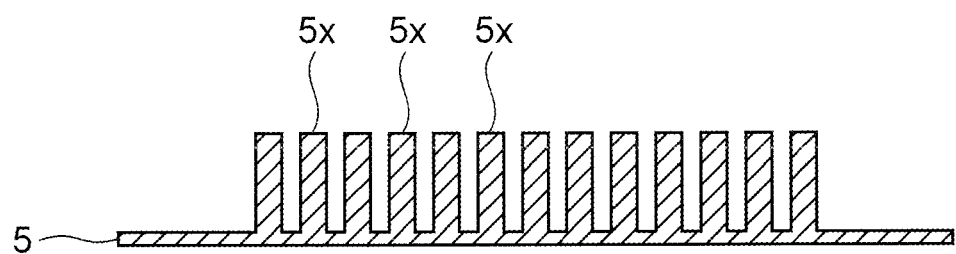
FIGS. 9A to 9C are cross-sectional views of the evaporator according to the embodiment in process of being manufactured.
Figure 9B:
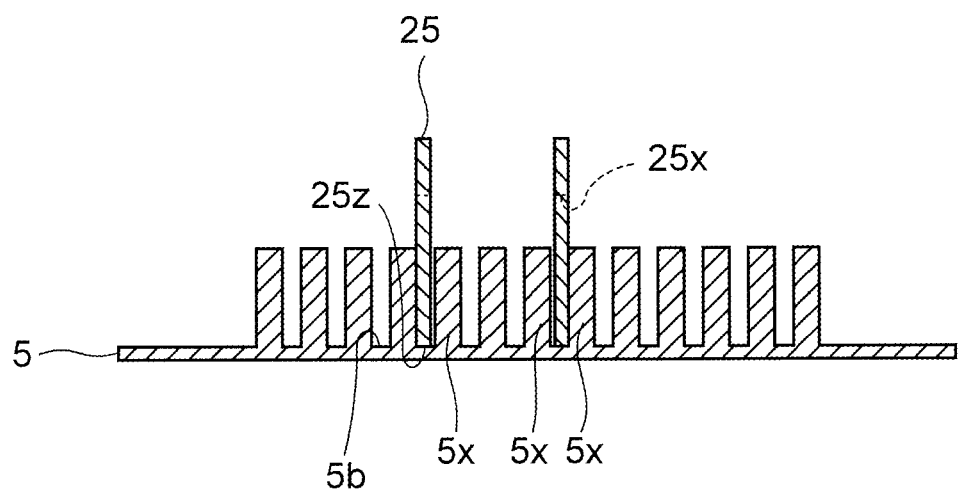
Figure 9C:
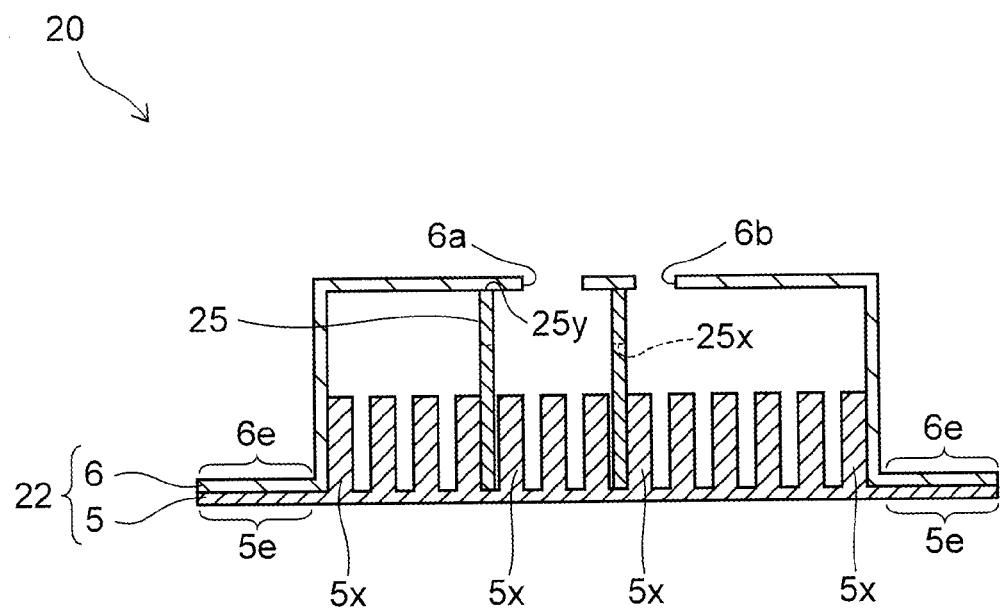

FIGS. 9A to 9C are cross-sectional views of the evaporator 20 according to the embodiment, as being in process of being manufactured.

First, as illustrated in FIG. 9A, a copper plate having a square plane shape whose side length is of the order of 40 to 60 mm is prepared, and machining is performed to form the plurality of protrusions 5x on a surface of the copper plate and thereby form the bottom plate 5. Note that forging may be used in place of the machining to form the protrusions 5x.

Then, as illustrated in FIG. 9B, the tubular-shaped reinforcing member 25 mentioned above is mounted on top of the bottom plate 5.

The reinforcing member 25 is formed by working a metal pipe such as a copper pipe, and its side portion is provided with the side openings 25x previously formed therein.

Then, a lower opening end 25z of the reinforcing member 25 and the bottom plate 5 are brazed together with high-temperature solder having a melting point on the order of 400 to 500° C., so that the reinforcing member 25 is fixed to the bottom plate 5.

Since fixing the reinforcing member 25 on the protrusions 5x makes it difficult for the reinforcing member 25 to reinforce the bottom plate 5, it is preferable that the reinforcing member 25 be fixed to the inside bottom surface 5b of the bottom plate 5 appearing between the protrusions 5x, as is the case with this example.

After that, as illustrated in FIG. 9C, the cover 6 is prepared, and the cover 6 is made of metal and is provided with the supply port 6a and the discharge port 6b previously formed therein. Examples of a metallic material for the cover 6 include copper and stainless steel.

Then, edge portions 5e of the bottom plate 5 and edge portions 6e of the cover 6 are brazed together thereby to obtain the container 22 including the bottom plate 5 and the cover 6. Note that high-temperature solder having a melting point on the order of 400 to 500° C. may be used for this brazing.

Here, the upper opening end 25y of the reinforcing member 25 may be fixed to the cover 6 by brazing, and the opening end 25y is not necessarily limited to being fixed to the cover 6.

Further, in this example, the reinforcing member 25 is fixed to the bottom plate 5 in advance; however, the reinforcing member 25 may be fixed to the cover 6 by brazing.

A basic structure of the evaporator 20 according to the embodiment is completed in the manner as above described.

According to the method of manufacturing the evaporator 20 as described above, the reinforcing member may be accommodated in the container 22, simultaneously with the cover 6 being fixed to the bottom plate 5 at the step of FIG. 9C. Therefore, a special step for accommodating the reinforcing member 25 in the container 22 is unnecessary, which does not lead to an increase in manufacturing cost.

According to the embodiment described above, the bottom plate 5 of the container 22 may be reinforced by the reinforcing member 25, and also, the coolant C may be prevented from escaping through the discharge port 6b with its state remaining in liquid phase.

Next, description will be given with regard to various examples of forms of the reinforcing member 25.

First Example

Figure 10:
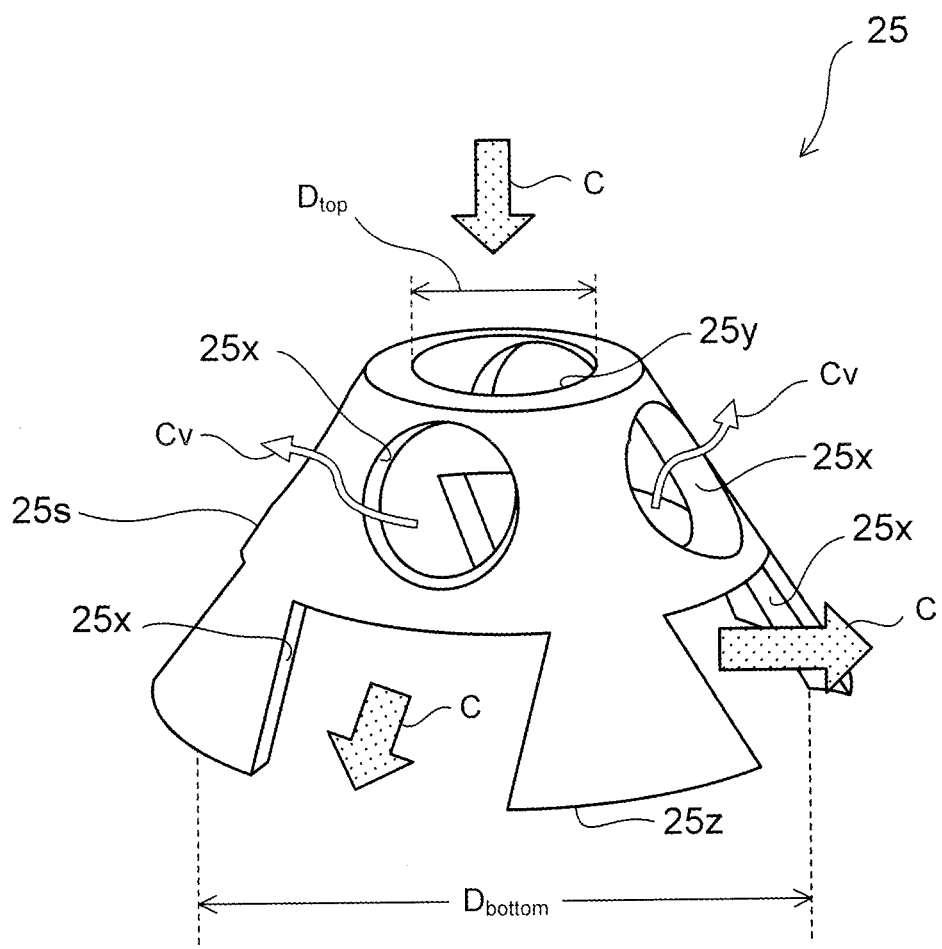
FIG. 10 is a perspective view of the reinforcing member according to a first example of the embodiment.

FIG. 10 is a perspective view of the reinforcing member 25 according to a first example.

As illustrated in FIG. 10, in the first example, the reinforcing member 25 is formed in a conical shape, and an opening is formed in a vertex of the conical shape thereby to form the upper opening end 25y.

Also, the plurality of side openings 25x are disposed at different levels in the side portion 25s of the reinforcing member 25. The side openings 25x are separately formed at the different levels in this manner, and thereby, the side portion 25s between the upper and lower adjacent side openings 25x functions as a beam to thus increase the strength of the reinforcing member 25.

When the strength of the reinforcing member 25 is not an issue, the upper and lower side openings 25x may be combined together into one opening.

Also, the coolant C in the liquid phase flows out through the lower side opening 25x of the two upper and lower adjacent side openings 25x, whereas the vapor Cv of the coolant C flows out through the upper side opening 25x.

Dimensions of the reinforcing member 25 are not particularly limited. For example, an inside diameter $D_{top}$ of the upper opening end 25y of the reinforcing member 25 may be set to the order of 6 to 7 mm, and an inside diameter $D_{bottom}$ of the lower opening end 25z thereof may be set to the order of about 20 mm.

Figure 11:
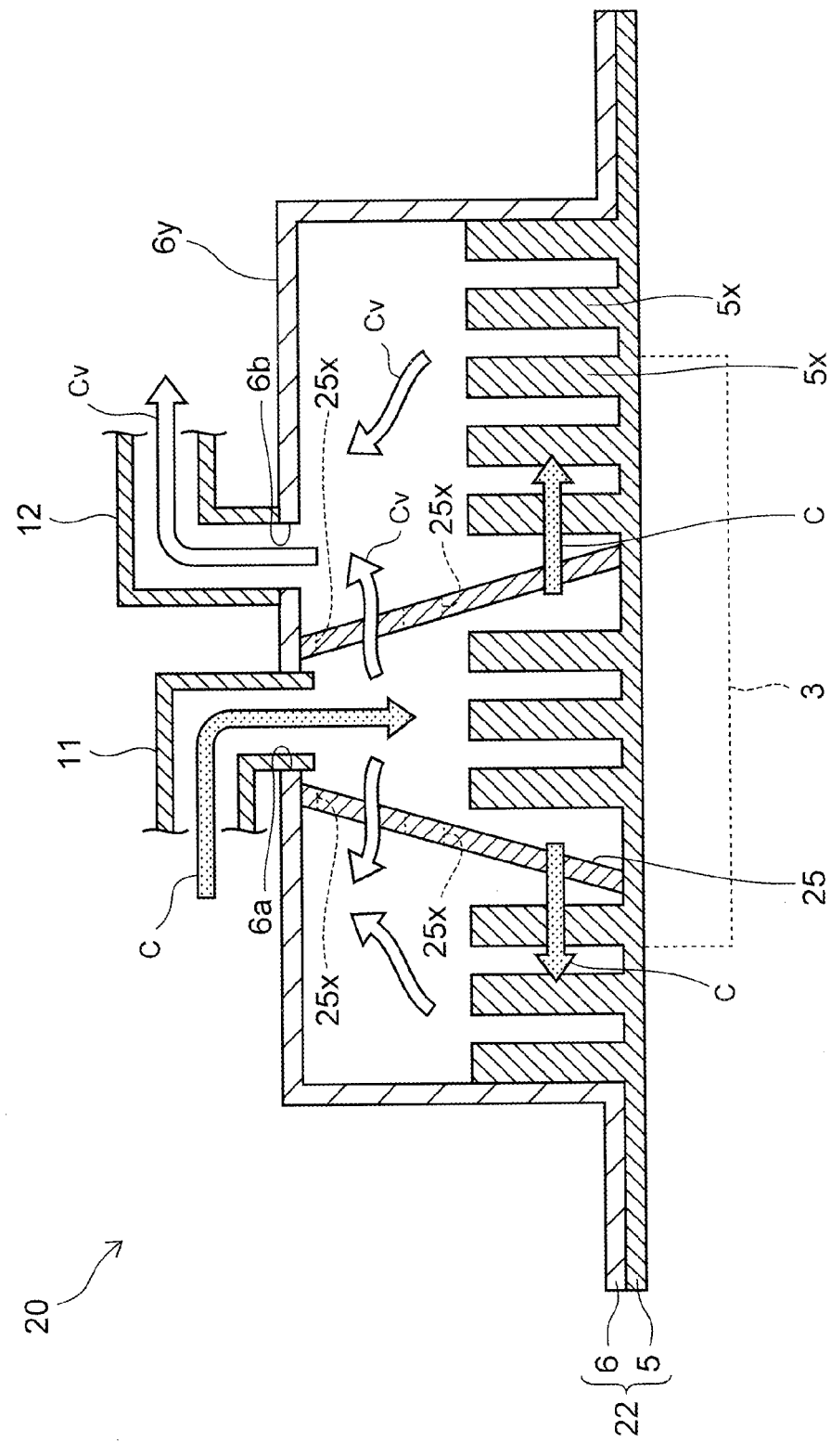
FIG. 11 is a cross-sectional view of the evaporator including the reinforcing member according to the first example of the embodiment.

FIG. 11 is a cross-sectional view of the evaporator 20 including the reinforcing member 25 according to the first example.

As illustrated in FIG. 11, the conically-shaped reinforcing member 25 is accommodated in the evaporator 20 in such a manner that a diameter becomes wider from the top plate 6y toward the bottom plate 5.

When the reinforcing member 25 has a wider diameter toward the bottom plate 5 in this manner, the coolant C immediately after reaching the bottom plate 5 through the supply port 6a is less likely to collide against the reinforcing member 25, which in turn enables reducing the resistance which the coolant C undergoes from the reinforcing member 25.

Second Example

Figure 12:
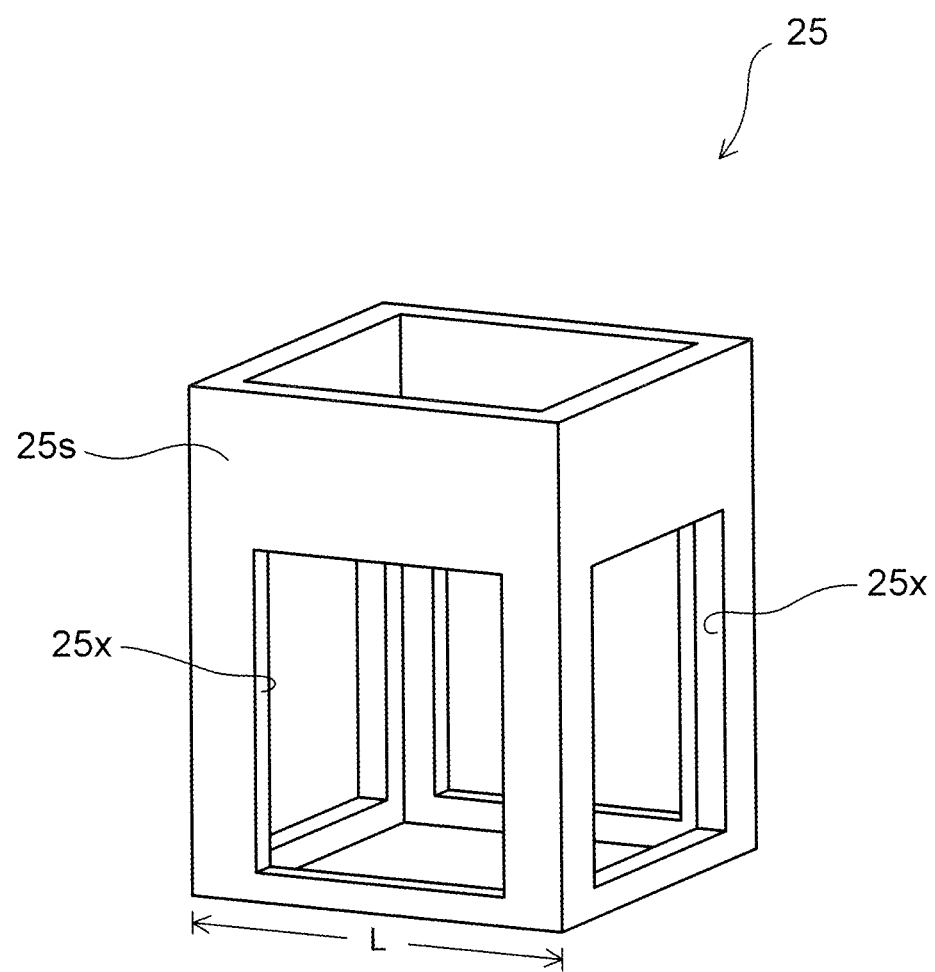
FIG. 12 is a perspective view of the reinforcing member according to a second example of the embodiment.

FIG. 12 is a perspective view of the reinforcing member 25 according to a second example.

As illustrated in FIG. 12, in the second example, the reinforcing member 25 is formed in a rectangular shape as seen in a top view.

A length L of one side of the reinforcing member 25 is of the order of 10 mm, for example.

The rectangular reinforcing member 25 may be easily manufactured by bending a metal plate such as a copper plate, thus enabling a reduction in manufacturing cost for the reinforcing member 25.

Third Example

The reinforcing member 25 is not limited to the rectangular shape as illustrated in the second example, and the reinforcing member 25 having any polygonal shape in a top view may be inexpensively manufactured by bending a metal plate.

Figure 13:
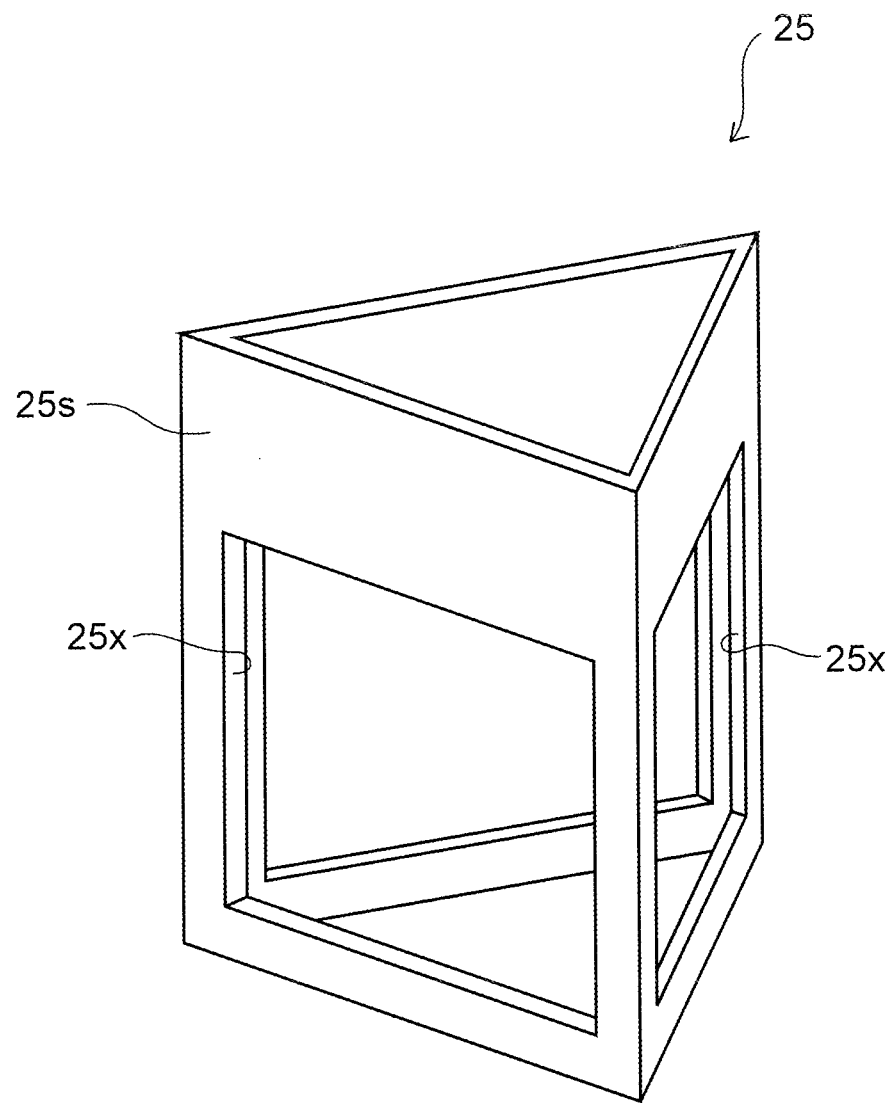
FIG. 13 is a perspective view of the reinforcing member according to a third example of the embodiment.

FIG. 13 is a perspective view of the reinforcing member 25 according to a third example.

In the third example, a triangular shape is adopted as one example of the polygonal shape, thereby achieving a cost reduction of the reinforcing member 25.

Another Embodiment

In the above description, the bottom plate 5 of the evaporator 20 is provided with the plurality of protrusions 5x, thereby increasing the area of contact between the bottom plate 5 and the coolant C; however, the protrusions 5x may be omitted, provided that a sufficient area of contact may be achieved even without the protrusions 5x.

Figure 14:
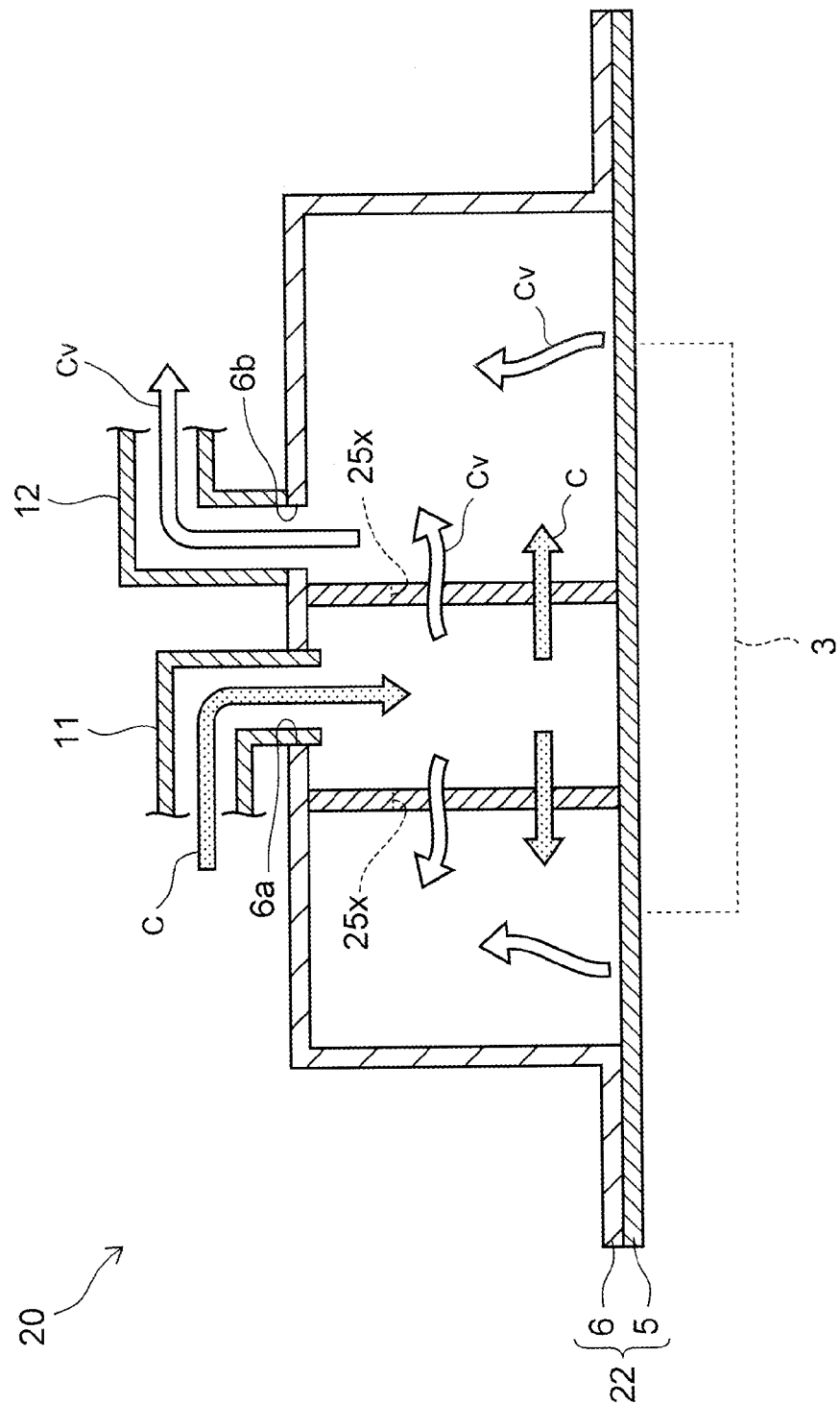
FIG. 14 is a cross-sectional view of the evaporator according to another embodiment.

FIG. 14 is a cross-sectional view of the evaporator 20 with the protrusions 5x omitted in this manner. Omission of the protrusions 5x eliminates a need for a step for forming the protrusions 5x, thus achieving a simplification of a manufacturing process for the evaporator 20.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An evaporator comprising:
   a container including a top plate, and a bottom plate configured to be heated by an electronic component;
   a reinforcing member having a tubular shape extending from the bottom plate to the top plate, and configured such that a coolant is introduced inside the reinforcing member;
   a first side opening formed at a lower level in a side portion of the reinforcing member, and configured to allow the coolant to flow out to the bottom plate;
   a second side opening formed at an upper level in the side portion of the reinforcing member than a level of the first side opening, having an opening shape different from that of the first side opening, and configured to allow vapor to flow out into the container, the vapor being generated by the coolant contacting the bottom plate;
   a discharge port provided in the top plate outside the reinforcing member, and configured to discharge the vapor from the container; and
   a plurality of protrusions provided on a bottom surface of the bottom plate in the container, the plurality of protrusions arranged in a grid pattern in a plan view at regular intervals over a length and breadth of the bottom surface.

2. The evaporator according to claim 1, wherein the reinforcing member has a cylindrical shape.

3. The evaporator according to claim 1, wherein the reinforcing member has a conical shape with a diameter increasing from the top plate toward the bottom plate.

4. The evaporator according to claim 1, wherein the reinforcing member has a polygonal shape in a top view.

5. The evaporator according to claim 1, wherein a plurality of the side openings are disposed at equal intervals around a center of the reinforcing member.

6. The evaporator according to claim 1, wherein the bottom plate is thinner than the top plate.

7. The evaporator according to claim 1, further comprising:
   a supply port provided in the top plate inside the reinforcing member, and configured to supply the coolant inside the reinforcing member,
   wherein the supply port and the discharge port are disposed in close proximity to each other in a central portion of the top plate.

8. The evaporator according to claim 1, wherein an opening area of the first side opening is equal to or larger than a surface area of the side portion of the reinforcing member.

9. A cooling device comprising:
   an evaporator configured to evaporate a coolant;
   a condenser configured to condense vapor of the coolant;
   a liquid pipe configured to connect the evaporator and the condenser so as to supply the coolant in liquid phase from the condenser to the evaporator; and
   a vapor pipe configured to connect the evaporator and the condenser so as to supply the vapor from the evaporator to the condenser, the evaporator comprises
   a container including a top plate, and a bottom plate configured to be heated by an electronic component,
   a reinforcing member having a tubular shape extending from the bottom plate to the top plate, and configured such that a coolant supplied through the liquid pipe is introduced inside the reinforcing member,
   a first side opening formed at a lower level in a side portion of the reinforcing member, and configured to allow the coolant to flow out to the bottom plate,
   a second side opening formed at an upper level in the side portion of the reinforcing member than a level of the first side opening, having an opening shape different from that of the first side opening, and configured to allow vapor to flow out into the container, the vapor being generated by the coolant contacting the bottom plate,
   a discharge port provided in the top plate outside the reinforcing member, and configured to discharge the vapor to the vapor pipe, and
   a plurality of protrusions provided on a bottom surface of the bottom plate in the container, the plurality of protrusions are arranged in a grid pattern in a plan view at regular intervals over a length and breadth of the bottom surface.

10. The cooling device according to claim 9, wherein an opening area of the first side opening is equal to or larger than a surface area of the side portion of the reinforcing member.

11. An electronic apparatus comprising:
    an electronic component;
    an evaporator configured to evaporate a coolant by heat of the electronic component;
    a condenser configured to condense vapor of the coolant;
    a liquid pipe configured to connect the evaporator and the condenser so as to supply the coolant in liquid phase from the condenser to the evaporator; and
    a vapor pipe configured to connect the evaporator and the condenser so as to supply the vapor from the evaporator to the condenser, the evaporator comprises
    a container including a top plate, and a bottom plate configured to be heated by the electronic component,
    a reinforcing member having a tubular shape extending from the bottom plate to the top plate, and configured such that a coolant supplied through the liquid pipe is introduced inside the reinforcing member,
    a first side opening formed at a lower level in a side portion of the reinforcing member, and configured to allow the coolant to flow out to the bottom plate,
    a second side opening formed at an upper level in the side portion of the reinforcing member than a level of the first side opening, having an opening shape different from that of the first side opening, and configured to allow vapor to flow out into the container, the vapor being generated by the coolant contacting the bottom plate;
    a discharge port provided in the top plate outside the reinforcing member, and configured to discharge the vapor to the vapor pipe, and
    a plurality of protrusions provided on a bottom surface of the bottom plate in the container, the plurality of protrusions are arranged in a grid pattern in a plan view at regular intervals over a length and breadth of the bottom surface.

12. The electronic apparatus according to claim 11, further comprising:
    a circuit board having the electronic component, the electronic component being fixed to the circuit board, wherein the evaporator is mechanically fixed to the circuit board with the electronic component sandwiched between the circuit board and the evaporator.

13. The electronic apparatus according to claim 11, wherein an opening area of the first side opening is equal to or larger than a surface area of the side portion of the reinforcing member.

\* \* \* \* \*